US009873290B2

(12) United States Patent
Matrascia et al.

(10) Patent No.: US 9,873,290 B2
(45) Date of Patent: *Jan. 23, 2018

(54) HIGH-PERFORMANCE TYRE FOR A MOTOR VEHICLE

(71) Applicant: PIRELLI TYRE S.P.A., Milan (IT)

(72) Inventors: Giuseppe Matrascia, Milan (IT); Vito Bello, Milan (IT); Mauirizio Boiocchi, Milan (IT)

(73) Assignee: PIRELLI TYRE S.P.A., Milan (IT)

( * ) Notice: Subject to any disclaimer, the term of this patent is extended or adjusted under 35 U.S.C. 154(b) by 748 days.

This patent is subject to a terminal disclaimer.

(21) Appl. No.: 14/099,410

(22) Filed: Dec. 6, 2013

(65) Prior Publication Data

US 2014/0090760 A1 Apr. 3, 2014
US 2017/0008348 A9 Jan. 12, 2017

Related U.S. Application Data

(63) Continuation of application No. 11/632,067, filed as application No. PCT/EP2004/051530 on Jul. 16, 2004, now Pat. No. 8,622,104.

(51) Int. Cl.
B60C 11/03 (2006.01)

(52) U.S. Cl.
CPC ...... *B60C 11/0304* (2013.01); *B60C 11/0306* (2013.01); *B60C 2011/0348* (2013.01); (Continued)

(58) Field of Classification Search
CPC ............ B60C 11/0304; B60C 11/0306; B60C 2011/0348; B60C 2011/0372; B60C 2011/0374
See application file for complete search history.

(56) References Cited

U.S. PATENT DOCUMENTS 4,984,616 A 1/1991 Shepler et al.
5,679,185 A 10/1997 Tanaka
(Continued)

FOREIGN PATENT DOCUMENTS

EP 565270 A1 * 10/1993
EP 0 627 332 A1 12/1994
(Continued)

OTHER PUBLICATIONS

"Acoustics—Specification of test tracks for the purpose of measuring noise emitted by road vehicles," ISO 10844, International Standard, pp. i-v and 1-18, (1994).
(Continued)

*Primary Examiner* — Steven D Maki
(74) *Attorney, Agent, or Firm* — Finnegan, Henderson, Farabow, Garrett & Dunner, L.L.P.

(57) ABSTRACT

A tire for a motor vehicle, in particular a high-performance, tire is provided with a tread having an overall width. The tread includes first and second circumferential grooves which separate a central region from first and second shoulder regions. The tread includes a circumferential cut in the first shoulder region at a distance from the first circumferential groove; and a plurality of circumferentially repeated transverse groove modules. A first shoulder portion of each transverse groove module includes at least one main transverse groove which includes a first substantially rectilinear portion inclined by a first angle with respect to a radial plane, a second substantially rectilinear portion inclined by a second angle with respect to the radial plane and arranged between the circumferential cut and the first circumferential groove, and a first curve portion connecting the first and the second substantially rectilinear portions.

28 Claims, 14 Drawing Sheets

(52) U.S. Cl.
CPC .......... *B60C 2011/0367* (2013.01); *B60C 2011/0369* (2013.01); *B60C 2011/0372* (2013.01); *B60C 2011/0374* (2013.01)

(56) References Cited

U.S. PATENT DOCUMENTS

| | | |
|---|---|---|
| 6,311,748 B1 | 11/2001 | Boiocchi et al. |
| 6,656,300 B1 | 12/2003 | Cesarini et al. |
| 8,622,104 B2 * | 1/2014 | Matrascia ........... B60C 11/0302 152/209.22 |
| 2003/0111149 A1 * | 6/2003 | Caretta ............... B60C 11/0302 152/209.1 |
| 2003/0121580 A1 * | 7/2003 | Bello ................ B60C 11/0309 152/209.25 |
| 2006/0188593 A1 | 8/2006 | Tanaka |

FOREIGN PATENT DOCUMENTS

| | | |
|---|---|---|
| EP | 0 812 709 B1 | 12/1997 |
| EP | 0 867 310 B1 | 9/1998 |
| EP | 1 120 295 A2 | 8/2001 |
| EP | 1 189 770 B1 | 3/2002 |
| JP | 06-048120 A * | 2/1994 |
| WO | WO-2006/007877 A1 * | 1/2006 |

OTHER PUBLICATIONS

Kobayashi, T., "Pneumatic Tire," Patent Abstracts of Japan, JP Publication No. 06043120, 1 Sheet, Published Feb. 22, 1994).
"Directive 2001/43/EC of the EC of the European Parliament and of the Council of Jun. 27, 2001 amending Council Directive 92/23/EEC relating to tyres for motor vehicle and their trailers and their fitting," p. 1-26, (2001).
"Acoustics—Measurement of noise emitted by accelerating road vehicles—Engineering method," ISO TC 43/SC 1 N, ISO/CD 362, International Standard, pp. i-vi and 1-36, (2002).

* cited by examiner

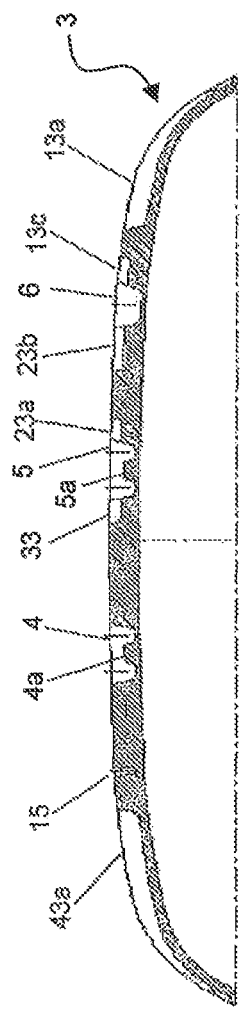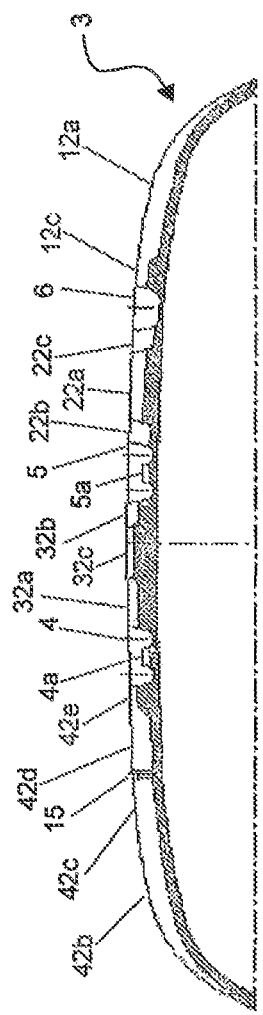

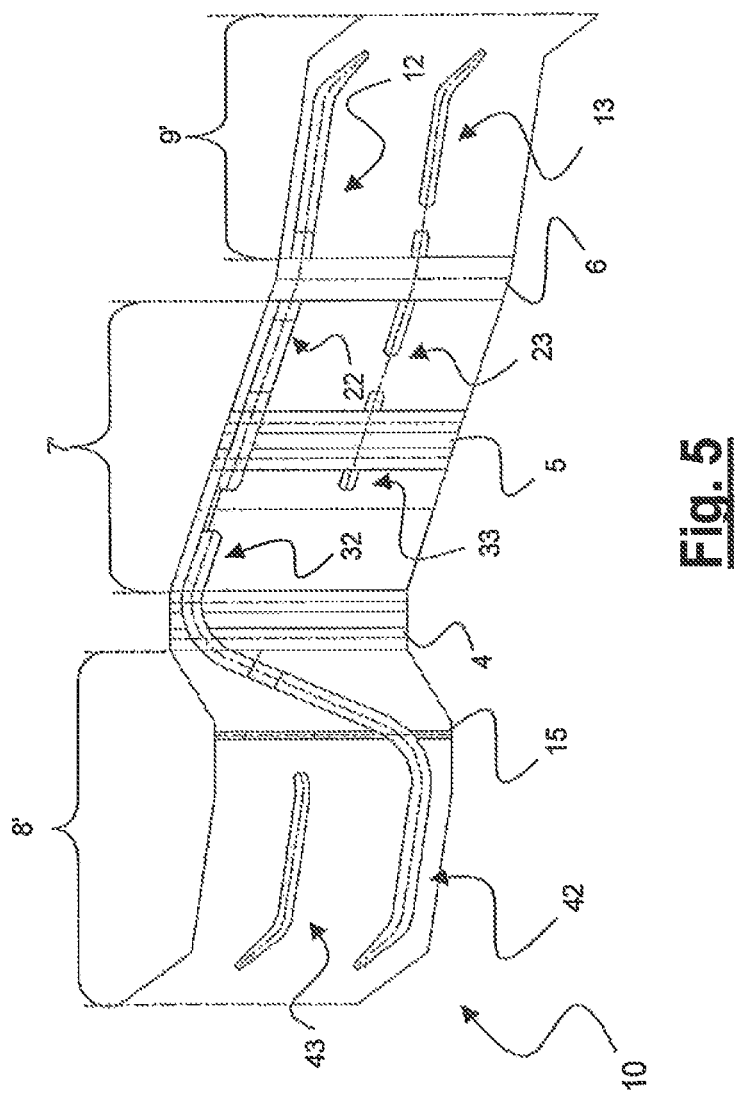

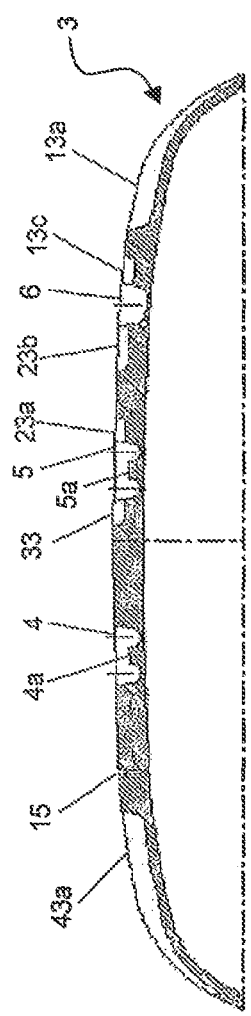
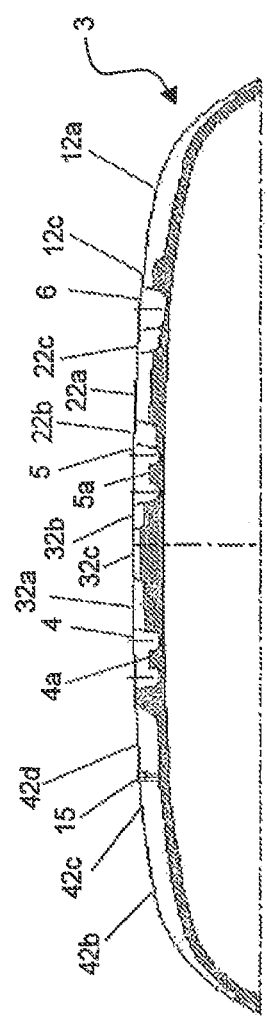

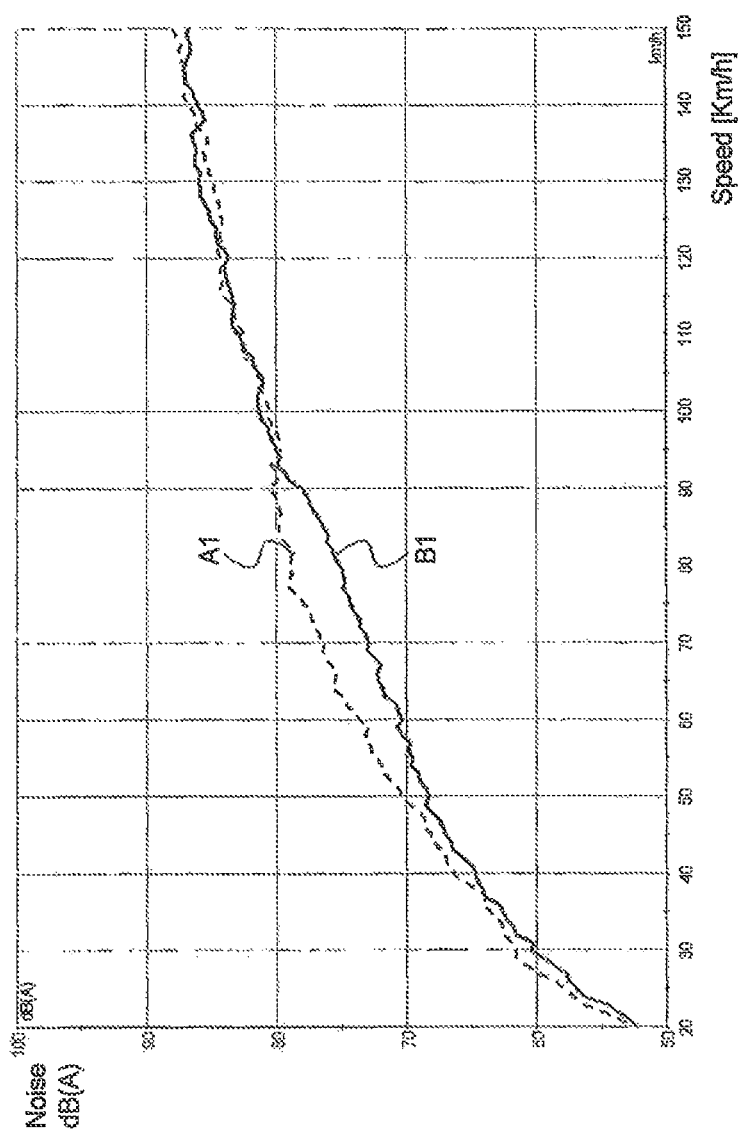

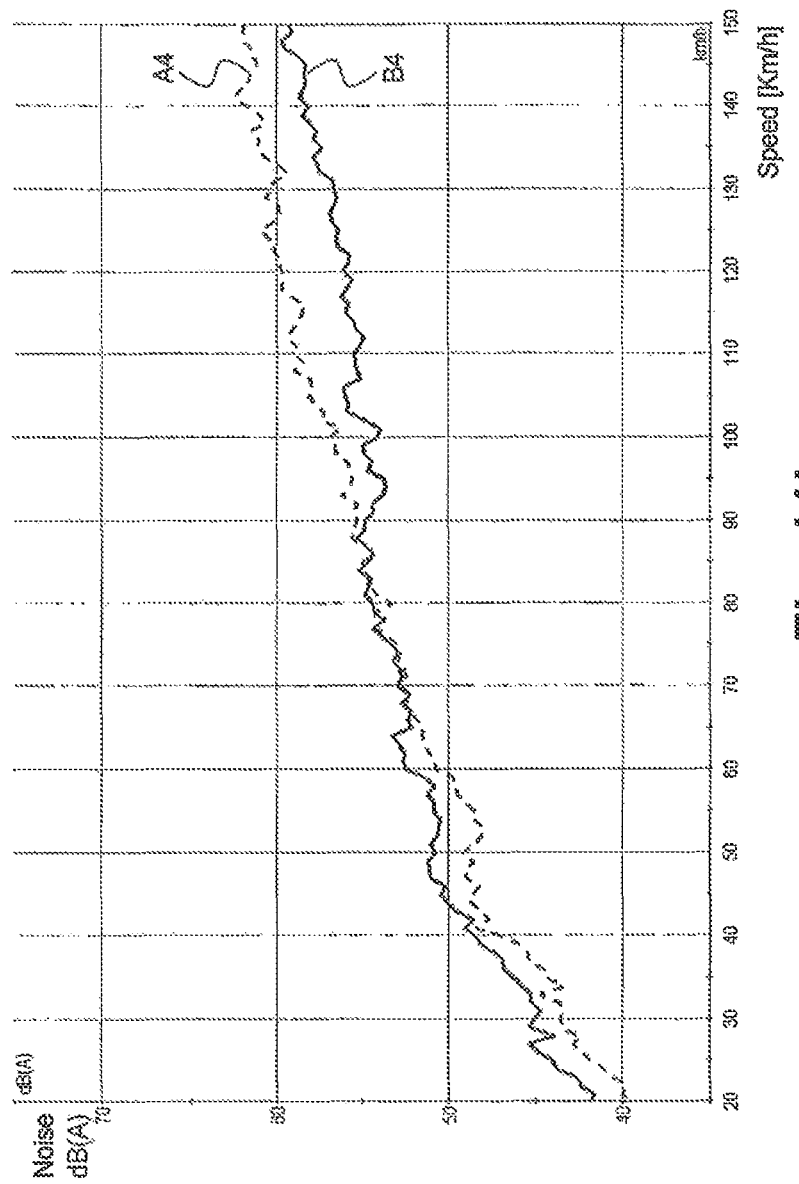

HIGH-PERFORMANCE TYRE FOR A MOTOR VEHICLE

CROSS-REFERENCE TO RELATED APPLICATIONS

This application is a continuation of application Ser. No. 11/632,067, which has a 35 U.S.C. § 371(c) date of Jan. 10, 2008, and which is an entry into the national stage under § 371 of PCT Application No. PCT/EP2004/051530, filed Jul. 16, 2004, all of which are incorporated herein by reference.

BACKGROUND OF THE INVENTION

Field of the Invention

The present invention relates to a tyre for a motor vehicle, in particular to a high-performance tyre.

Description of the Related Art

Motor vehicle tyres having a tread provided with blocks delimited by circumferential grooves extending in a substantially longitudinal direction and by transverse grooves extending in a substantially axial direction are known. The blocks resulting from the intersection of said grooves are formed in various suitably designed shapes and are arranged in adjacent circumferential rows, each of which is located between two successive circumferential grooves.

The circumferential grooves may influence the directional and travel stability properties of the tyre in relation to the lateral (slip) thrusts directed parallel to the rotation axis of the tyre.

The transverse grooves, in turn, may influence the traction properties of the tyre, namely its capacity to transmit efficiently to the road surface the tangential thrusts parallel to the direction of travel during acceleration and braking of the motor vehicle.

The circumferential grooves may also influence the draining of the water in the area making contact with the road surface (footprint area) during travel on a wet road surface.

Furthermore, the presence of transverse and circumferential grooves influences the rolling noise of the tyre. In fact, one of the main causes of noisiness is the continuous succession of impacts of the edges of the blocks on the road surface.

A further cause of noisiness consists in dragging of the blocks on the road surface when they enter and leave the area of contact with the road surface. This dragging is due essentially to the deformation of the tread both when the tyre is flattened against the road surface and when it recovers its inflated condition, as it leaves the area of contact with the road surface.

The deformations of the tread when coming into contact with and leaving the area of contact with the road surface also produce a cyclical volumetric variation of the grooves which delimit the blocks and a consequent cyclical action of compression and expansion of the air trapped inside the grooves. These phenomena of compression and expansion of the air increase the rolling noise of the tyre.

Various measures which tend to limit the rolling noise of a tyre are known. One of these consists in providing the blocks with different longitudinal dimensions, by adopting two or more different pitch values distributed in circumferential succession—called "pitch sequence"—such as to provide the maximum possible lack of uniformity over the circumferential extension of the tread. The aim is to distribute the acoustic energy due to the impacts and dragging of the blocks over a wide spectrum of frequencies, thus avoiding concentrating it in a specific frequency and producing bothersome noise.

The noisiness of a tyre, measured in accordance with New Dir. 2001/43/EC Aug. 4, 2001, is considered unacceptable when it exceeds the following limits:

| tyre width 145 mm | 72 dB(A) |
| tyre width >145 and 165 mm | 73 dB(A) |
| tyre width >165 and 185 mm | 74 dB(A) |
| tyre width >185 and 215 mm | 75 dB(A) |
| tyre width >215 mm | 76 dB(A) |

The noisiness of tyres is a problem which is difficult to solve because some measures which tend to reduce it adversely affect the directional, traction and water drainage properties.

EP 1 189 770 B1 describes a high performance tyre for a motor vehicle provided with a tread having an overall width L and comprising two deep circumferential grooves which separate a central region from two lateral shoulder regions, said shoulder regions being provided with shoulder blocks, the sum of the widths of said lateral shoulder regions being equal to or less than 60% of the overall width L, the width of each of the shoulder regions being not less than 20% of said overall width L, each of said circumferential grooves being adjacent, on the side further from the central region, to a continuous track from which are branched transverse grooves which delimit said shoulder blocks, said continuous track terminating in a continuous wall which forms a lateral wait of said circumferential groove, characterized in that said continuous lateral wall of at least one circumferential groove has a profile, in a radial plane, which is more inclined, with respect to a center-line axis of said circumferential groove, than the profile of the facing lateral wall of said circumferential groove, and in that the blocks of the central rows are separated by transverse grooves having a bottom wall with a shaped profile of variable depth.

EP 0 812 709 describes a tyre having a tread comprising two regions at least one of which is provided with a plurality of inclined main grooves, each of which comprises a segment with a steep inclination and a segment with a slight inclination. A lateral band of the two regions has an auxiliary groove with a steep inclination communicating with two adjacent, inclined, main grooves and an auxiliary groove with a slight inclination, situated between the two adjacent, inclined, main grooves. In a first embodiment, the inclined main grooves extend from a circumferential groove close to the equatorial plane of the tyre, while in a second embodiment they have a blind bottom. In a third embodiment, the steeply inclined segments of two adjacent, inclined, main grooves are joined by a thin transverse groove.

EP 0 867 310 describes a tyre comprising blocks formed in a tread portion by means of a plurality of circumferential grooves and a plurality of directionally inclined grooves. At least some of the directionally inclined grooves extend from a circumferential groove close to the equatorial plane of the tyre and extend towards one end of the area of the tread making contact with the ground. Each of the blocks has an angled portion which forms an acute angle of 10°-60 defined by a circumferential groove and a directionally inclined groove. The surface of the angled portion of the block is chamfered over a distance of 10-30 mm from a tapered end thereof in a longitudinal direction so as to vary gradually towards a portion of larger width.

Nowadays high performance vehicles are more and more governed by electronic systems. Such systems manage different driving conditions and modify the dynamic behavior of the vehicle for improving, for instance, stability, braking and acceleration performances thereof. In this scenario, high performance tyres are required to work in a different way with respect to tyres of the past and need to be redesigned (in terms of tread pattern and internal structure thereof) so as to meet the relevant changes introduced in the vehicle behavior by the electronic systems.

It can be pointed out that high performance vehicles have a negative camber while running under normal driving conditions, but have null or positive camber when high lateral accelerations and/or quick load transfers occur. Since the electronic systems sensibly and actively intervene on the vehicle behavior, the tread pattern designs have to take into account said fact.

In the following description, the terms "HP" (High Performance) or "UHP" (Ultra High Performance) tyres indicate tyres which are suitable for applications involving high operating speeds (e.g. higher than 200 km/h) and/or extreme driving conditions. In particular, the terms High Performance or Ultra High Performance tyres are intended to indicate tyres which belong to Classes "H" and "V" (maximum speed over 210 Km/h) and to Classes "W" and "Y" (maximum speed over 240 Km/h).

SUMMARY OF THE INVENTION

The Applicant has perceived the necessity of improving the handling properties of a high performance tyre, in particular (but not exclusively) of an asymmetric tyre, meanwhile ensuring good aquaplaning, grip and noiseness properties.

In particular, the Applicant has perceived the necessity of increasing the lateral stiffness of at least one shoulder region, particularly of the external one, of a high performance tyre so as to withstand the relevant lateral thrusts which arise, for instance, during high speed cornering maneuvers or in extreme driving conditions, e.g. while running at the limit of adherence.

Even though the maximum lateral stiffness can be achieved by a slick tyre (wherein the maximum amount of rubber contacts the rolling surface in the tyre footprint area), it is apparent that such a technical solution is not acceptable for a tyre which is required to be used on roads and not on race circuits since a slick tyre has no aquaplaning performance at all.

On the contrary, even though the aquaplaning performances can be improved by providing at least one longitudinal groove in the external shoulder region, this would generally lead to a reduction of the lateral stiffness since a lower amount of rubber would be in contact with the rolling surface. However, this reduction is at least partially compensated by a hinge effect which causes an increase of the tyre footprint area in correspondence of the zone adjacent to said at least one longitudinal groove.

The Applicant has thus perceived the necessity of providing a tyre which combines high performances in terms of handling, especially lateral stiffness, and aquaplaning, without negatively affecting grip and noise characteristics.

The Applicant has found that such a combination of performances can be advantageously achieved by providing the tyre tread pattern with at least two circumferential grooves which define two distinct shoulder regions, one of said shoulder regions being provided with a shoulder circumferential cut—located at a certain distance from the adjacent circumferential groove—and with a plurality of main transverse grooves that are positioned in the tread area comprised between said circumferential cut and the circumferential groove adjacent to said shoulder region. According to the present invention, said shoulder region is the external shoulder region (i.e. external with respect to the vehicle side, as described in the following of the present description) since, as mentioned above, during high speed cornering maneuvers, the external wheel, and thus the external shoulder region, is required to support a prevailing portion of the vehicle load.

According to the present invention said main transverse grooves are remarkably inclined (with respect to a radial plane of the tyre) towards said circumferential groove so as to provide the tyre with good handling performances as well as with good aquaplaning performances.

In fact, as far as the handling performances are concerned, the inclined main transverse grooves confer a suitable flexibility to the shoulder region in the lateral direction so that the tyre footprint area is advantageously increased. Meanwhile, said inclined main transverse grooves do not negatively affect the lateral stiffness of the shoulder region thanks to the positive contribution of the hinge effect mentioned above.

Furthermore, the inclination of the main transverse grooves compensates the ply steer force which is generated—in each tyre—by the inclination of the metallic cords of the tyre outermost belt layer, said ply steer force being directed along the cords inclination. The main transverse grooves according to the tread pattern of the present invention allow to balance said ply steer forces so that the equilibrium of the tyre is advantageously increased.

As far as the aquaplaning performances are concerned, the inclined main transverse grooves contribute in discharging the water from the tyre footprint area and thus support the discharging effect carried out by the circumferential grooves. In particular, while the circumferential grooves discharge the water from the central rear (with respect to the rolling direction) side of the tyre footprint area, the main transverse grooves discharge the water from a lateral (external) side of the tyre footprint area. This effect remarkably contributes in increasing the aquaplaning performance of the tyre, especially the aquaplaning performance when high speed cornering maneuvers are performed.

Moreover, the Applicant has found that the shoulder circumferential cut of the tread pattern of the present invention has a positive hinge effect which contributes in increasing the flexibility of the tyre shoulder region and thus, as mentioned above, the handling performance is advantageously increased.

Furthermore, the tread pattern of the present invention allows to achieve good noisiness performances both inside and outside a vehicle, with an excellent performance on wet and dry road surfaces at high speeds.

According to the present invention, a tyre for a motor vehicle, in particular a high-performance tyre, is provided, said tyre being provided with a tread having an overall width L. The tread comprises a first and a second circumferential grooves which separate a central region from a first and a second shoulder regions. According to the invention, the tread comprises a circumferential cut in the first shoulder region at a distance from said first circumferential groove; and a plurality of circumferentially repeated transverse groove modules. A first shoulder portion of each transverse groove module comprises at least one main transverse groove which comprises: a first substantially rectilinear portion inclined by a first angle with respect to a radial plane, a second substantially rectilinear portion inclined by a second angle with respect to the radial plane and arranged between the circumferential cut and the first circumferential groove, and a first curve portion connecting the first and the second substantially rectilinear portions.

Preferably, the main transverse groove further comprises a second curve portion connecting the second substantially rectilinear portion to the first circumferential groove.

The second curve portion, preferably, has a depth that is lower than a depth of said second substantially rectilinear portion.

Preferably, the first shoulder region has a width that is between 25% and 35% of the overall width.

Preferably, the distance between the circumferential cut and the first circumferential groove is between 25% and 35% of a width of the first shoulder region.

According to an embodiment of the invention, the second substantially rectilinear portion ends at a distance from said first circumferential groove that is from about 5% to about 40% of the distance between the circumferential cut and the first circumferential groove.

According to an embodiment of the invention, the second substantially rectilinear portion ends at a distance from the first circumferential groove that is between about 30% and 40% of a width of the first circumferential groove.

Preferably, the first angle ranges from 3° to 10°. More preferably, it ranges from 7° to 9°.

Preferably, the second angle ranges from 105° to 130°. More preferably, it ranges from 110° to 120°.

According to the present invention, the main transverse groove further comprises a tail connected to the first substantially rectilinear portion.

Preferably, the circumferential cut comprises cut portions having a first depth and cut portions having a second depth, the first depth being lower than the second depth.

Typically, the main transverse groove crosses the circumferential cut at a cut portion having said first depth.

According to the present invention, for each transverse groove module, the tyre further comprises a secondary transverse groove. In turn, such said secondary transverse groove comprises a tail and a substantially rectilinear portion parallel to the first substantially rectilinear portion of the main transverse groove of the first shoulder portion.

Preferably, the secondary transverse groove has a width that is lower than a width of the main transverse groove.

Preferably, the tyre according to the invention comprises, for each transverse groove module, a main transverse groove and a secondary transverse groove at least partially parallel to said main transverse groove.

Preferably, the main transverse groove and the secondary transverse groove are inclined by a third angle with respect to the radial plane, the third angle ranges from 3° to 10°.

According to a preferred embodiment, the third angle is the same as said first angle.

Profitably, the central region comprises, for each transverse groove module, a main transverse groove and a secondary transverse groove.

Advantageously, the secondary transverse groove is parallel to the main transverse groove.

Preferably, the main and secondary transverse grooves are inclined by a fourth angle with respect to a radial plane, said third angle ranging from 10° to 30°.

According to one embodiment of the invention, the second shoulder region comprises, for each transverse groove module, a main transverse groove that is a mirror image of the main transverse groove of said first shoulder region with respect to the tyre equatorial plane. In that case, the main transverse groove of the second shoulder region is preferably circumferentially staggered of a distance with respect to the main transverse groove of the first shoulder region.

Typically, the number of transverse groove modules is between 28 and 40.

Profitably, the transverse groove modules are circumferentially consecutive.

BRIEF DESCRIPTION OF THE DRAWINGS

Further characteristics and advantages of the present invention will be illustrated with reference to embodiments illustrated, by way of example and not of limitation, in the attached figures, wherein:

FIG. 3 is a partial cross section of the tyre of FIG. 1 along line 3-3 in FIG. 2;

FIG. 4 is a partial cross section of the tyre of FIG. 1 along line 4-4 in FIG. 2;

FIG. 5 is an enlarged view of a transverse groove module forming the tread of the tyre shown in FIG. 1;

FIG. 7 is a partial cross section of the tyre of FIG. 6 along line 7-7 in FIG. 6;

FIG. 8 is a partial cross section of the tyre of FIG. 1 along line 8-8 in FIG. 6;

FIGS. 10a, 10b, 11a, 11b show graphs relating to noise level outside and inside a test car;

The same reference numbers will be used in the various Figures for indicating the same parts or functionally equivalent components.

DETAILED DESCRIPTION OF THE INVENTION

Figure 1:
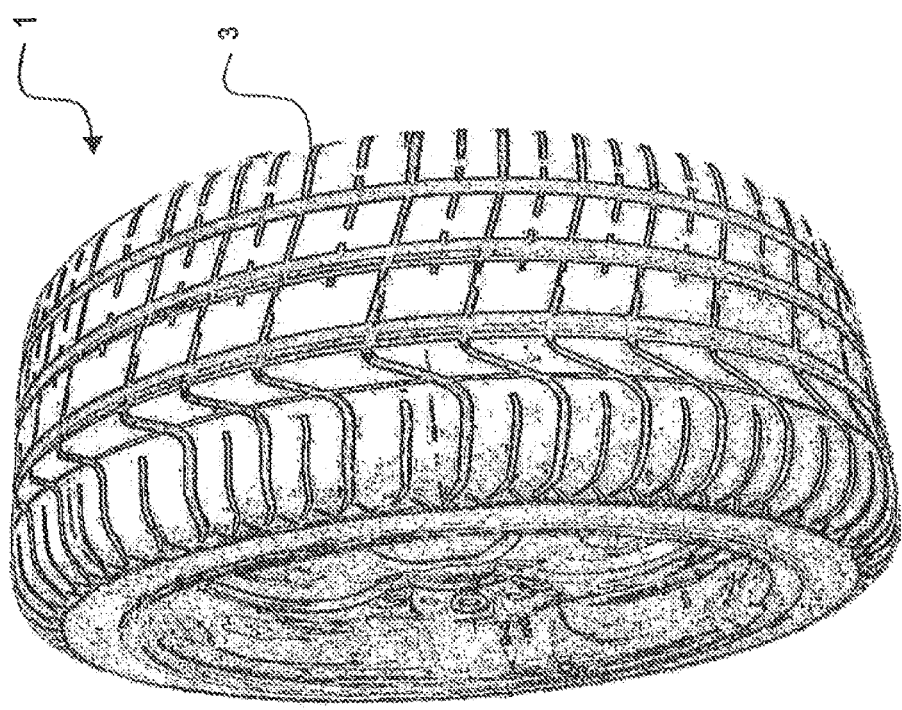
FIG. 1 is a perspective view of a tyre according to a first embodiment of the present invention.
Figure 2:
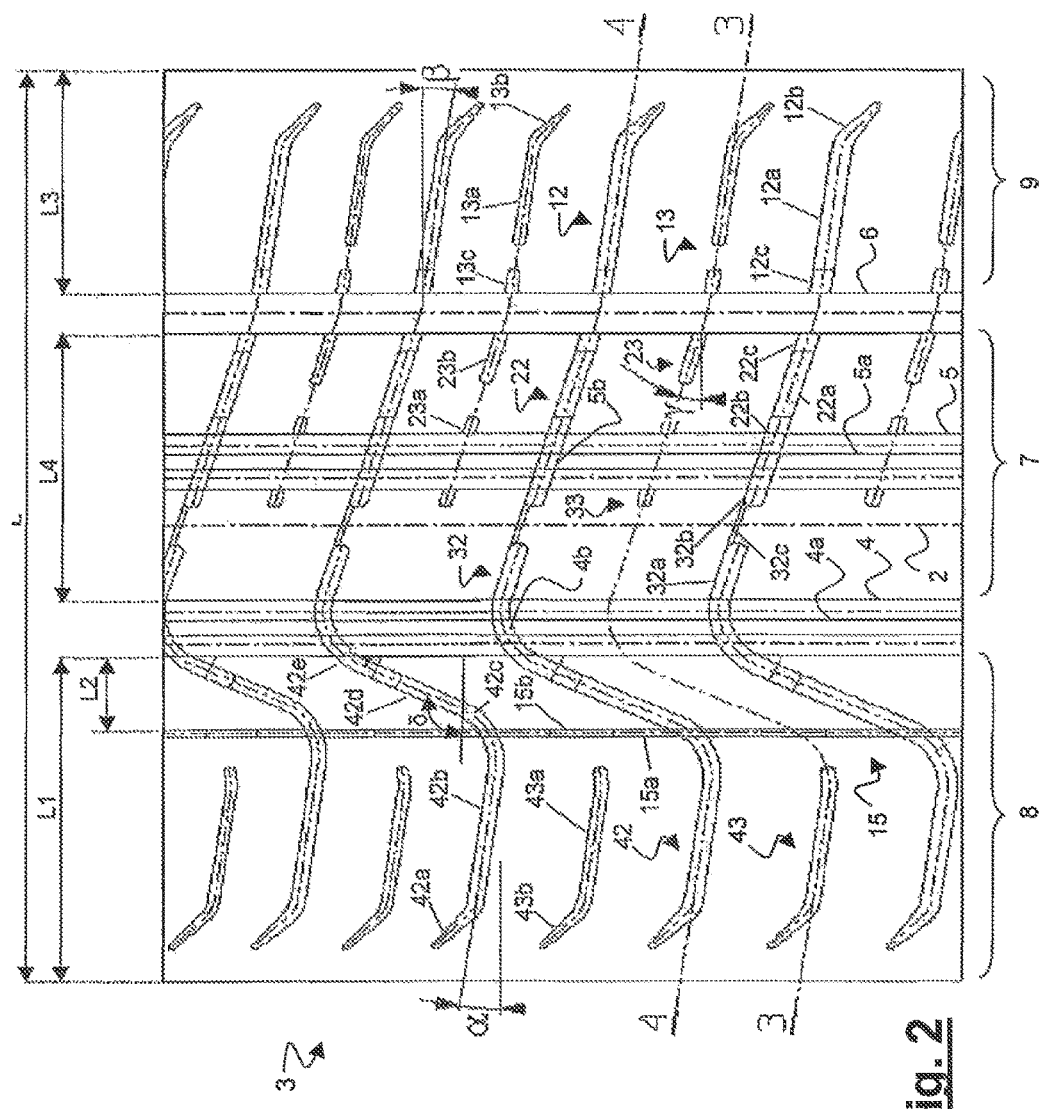
FIG. 2 is a partial plan view of a tread of the tyre shown in FIG. 1.

FIG. 2 is a partial plan view of a tread 3 of the tyre shown in FIG. 1 in accordance with a first embodiment of the present invention. Tyre 1 is of the asymmetric type; in other words, it has a pattern which is different (i.e. asymmetric) on each side of an equatorial plane 2 (FIG. 2).

The structure of the tyre is of the conventional type and comprises a carcass, a tread band located on the crown of said carcass, a pair of axially superimposed sidewalls terminating in beads reinforced with bead wires and corresponding bead fillers, for securing said tyre to a corresponding mounting rim. The tyre preferably also comprises a belt structure interposed between the carcass and the tread band. More preferably, the tyre is of the type with a markedly flattened section, for example in the range from 0.65 to 0.30, where these figures express the percentage value of the ratio between the height of the cross right section of the tyre and the maximum chord of said section. In the art, this ratio is usually referred to as H/C.

The carcass is reinforced with one or more carcass plies associated to said bead wires, while the belt structure generally comprises two belt layers, usually comprising metal cords, parallel to each other in each layer and crossing over those of the adjacent layers, preferably inclined symmetrically with respect to the equatorial plane, and radially superimposed on each other. Preferably, the belt structure also comprises a third belt layer, in a radially outermost position, provided with rubberized cords, preferably textile cords, oriented circumferentially, i.e. with a disposition at substantially zero degrees with respect to said equatorial plane.

Tyre 1 has a tread 3 of elastomeric material, provided with three circumferential grooves 4, 5 and 6. Grooves 4 and 6 divide a tread central region 7 from two shoulder regions 8 and 9, located on the left and on the right of the equatorial plane 2, respectively. Shoulder region 8 will be also referred to as "external shoulder region". Similarly, shoulder region 9 will be also referred to as "internal shoulder region". The terms "internal" and "external" are referred to a vehicle on which the tyre is mounted: "internal" stands for "internal with respect to the vehicle", while "external" stands for "externally with respect to the vehicle". The tread central region 7 of tyre 1 comprises the central circumferential groove 5.

Preferably, shoulder circumferential groove 6 has a width less than that of circumferential grooves 4 and 5. Unless otherwise indicated, a width of a groove, a cut, a notch or similar elements is a measure taken on the top thereof, in correspondence of the tread surface. The width of shoulder circumferential groove 6 is preferably between 10.0 mm and 14.0 mm. The maximum depth of lateral circumferential groove 6 is preferably between 5.5 mm and 8.5 mm. Circumferential groove 4 has a width preferably between 13.0 mm and 22.0 mm. The maximum depth of circumferential groove 4 is preferably between 5.5 mm and 9.0 mm. Preferably, the bottom of circumferential groove 4 has a central circumferential raising portion 4a which has the function of stiffening the circumferential groove 4. Thus, at the circumferential raising portion 4a, the circumferential groove 4 is about 4.5-8.0 mm depth. According to a preferred embodiment, circumferential grooves 4 and 5 have substantially the same shape and dimensions. In such a preferred embodiment, also groove 5 is provided with a raising portion 5a similar to raising portion 4a of groove 4.

The tread 3 of FIG. 2 is formed by a number p, typically from 28 to 40, of transverse groove modules 10. Said number p indicates the number of pitches present in the tread pattern of the present invention. A single module 10 of the tread of FIG. 2 is shown in FIG. 5 and comprises a tread central portion 7', a first shoulder portion 8' and a second shoulder portion 9'.

In the present description, each angle—which is used to indicate the inclination of a given tread pattern element—is intended to be calculated as the angle defined between a radial plane of the tyre and the plane said given tread pattern element belongs to, said angle being obtained by a counterclockwise rotation of the plane of the given tread pattern element towards the radial plane of the tyre. Internal shoulder region 9 will be described here below. It comprises a plurality of main transverse grooves 12 and a plurality of secondary transverse grooves 13. The main transverse groove 12 comprises a rectilinear portion 12a inclined by an angle β of about 3°-10° (preferably 7°-9°, more preferably about) 8° with respect to a radial plane and a tail 12b that is substantially at about 45° with respect to a radial plane. The top end of rectilinear portion 12a communicates with groove 6 by a reduced depth rectilinear portion 12c. Thus, the main transverse groove 12 has a depth ranging from about 2.0-4.0 mm (at 12c) to about 4.0-8.0 mm (in the first portion of the rectilinear portion 12a) to zero (at the end of tail 12b). The width of rectilinear portions 12a and 12c of the main transverse groove 12 is about 4.0-8.0 mm. Similarly, the secondary transverse groove 13 comprises a rectilinear portion 13a, inclined preferably by the same angle β as above, and a tail 13b. The secondary transverse groove 13 has a depth ranging from about 4.0-8.0 mm (in the first portion of the rectilinear portion 13a) to zero (at the end of tail 13b). The width of rectilinear portion 13a of the main transverse groove 13 is about 2.5-8.0 mm. The secondary transverse groove 13 further comprises a notch 13c having the same width of the rectilinear portion 13a (about 2.5-8.0 mm) and a depth of about 2.0-8.0 mm. The notch 13c could be separated from the top end of the rectilinear portion 13a as shown in FIG. 2 and FIG. 3.

In the shoulder region 9 a number of shoulder blocks are formed between two main transverse grooves. The number of shoulder blocks in region 9 ranges from 28 to 40.

The tread central region 7 of tyre 1 will now be described in detail. As said above, it comprises the central circumferential groove 5 dividing the central region 7 into two parts.

In the first part (the one adjacent to circumferential groove 6) of the central region 7, main transverse grooves 22 and secondary transverse grooves 23 are provided. The main transverse grooves 22 extend from circumferential groove 5 to circumferential groove 6 and are inclined by angle γ which is preferably greater than β. Preferably, γ=10°-30° (more preferably, γ=about 15°-20°, still more preferably γ=16°-18°) with respect to a radial plane. The width of main transverse grooves 22 is preferably the same as main transverse groove 12. The main transverse groove 22 has, in a middle part thereof (22a), a depth of about 3.0-8.0 mm; the main transverse groove 22 has, in end parts thereof (22b, 22c), a depth of about 4.0-8.0 mm. The secondary transverse grooves 23 are preferably inclined by the same angle γ as the main transverse grooves 22. Preferably, the secondary transverse grooves 23 have the same width of secondary transverse grooves 13 and have a depth of about 2.0-8.0 mm. In a first embodiment (the one of FIGS. 2 and 3) the secondary transverse groove 23 comprises two separate secondary transverse groove portions 23a, 23b. Groove portion 23a communicates with the central circumferential groove 5 and groove portion 23b communicates with circumferential groove 6. In a second alternative embodiment (not shown), the two separate secondary transverse groove portions 23a, 23b are connected together, preferably by a sipe.

A number of first central blocks are provided between two main transverse grooves 22. The number of first central blocks ranges between 28 and 40. Preferably, the number of first central blocks is the same as the number of blocks in the shoulder region 9.

In the second part (the one between circumferential grooves 4 and 5) of the central region 7, main transverse grooves 32 and secondary transverse grooves 33 are provided. Preferably, both the main and secondary transverse grooves 32 and 33 are inclined of the same angle γ as transverse grooves 22 and 23, respectively. Preferably, the main transverse groove 32 has the same width of transverse groove 22 and has a depth of about 2.0-8.0 mm. According to a preferred embodiment (shown in FIG. 2), the main transverse groove 32 comprises two separate portions 32a, 32b connected by a transverse sipe 32c. Sipe 32c crosses the equatorial plane of the tyre and has a depth of about 2.0-6.0 mm. Preferably, sipe 32c has a width of about 1.0-2.0 mm. Preferably, secondary transverse groove 33 extends in proximity of central circumferential groove 5. Preferably, secondary transverse groove 33 has a depth of about 2.0-8.0 mm. Preferably, secondary transverse groove 33 has a width of about 2.5-8.0 mm. Preferably, the circumferential groove 5 is provided with a circumferential raising portion 5a which contributes in stiffening the circumferential groove 5. According to a preferred embodiment of the present invention, the circumferential raising portion 5a of circumferential groove 5 has depressions 5b in correspondence of the main transverse grooves 22 and 32.

A number of second central blocks are provided between two main transverse grooves 32. The number of second central blocks ranges between 28 and 40. Preferably, the number of second central blocks is the same as the first central blocks as well as the blocks in the shoulder region 9.

The external shoulder region 8 will be now described in detail. The external shoulder region 8 comprises: a circumferential cut 15, a plurality of main transverse grooves 42 and a plurality of secondary transverse grooves 43.

In the present description, by "circumferential cut" it is meant a notch running circumferentially and having a width not higher than 35% of the width of any circumferential groove in the tyre. Preferably, the circumferential out width is less than 30% (and still more preferably less than about 25%) of the width of any circumferential groove. Preferably, the circumferential cut width is of from 10% to 30% of the width of any circumferential groove.

The secondary transverse groove 43 comprises a substantially rectilinear portion 43a and an external tail 43b which is substantially at 45° with respect to a radial plane. Preferably, the substantially rectilinear portion 43a is inclined by an angle α. Preferably, α ranges from 3' to 10°, more preferably between about 7" and 9'. According to a preferred embodiment, α has the same value of β: in other words, secondary transverse grooves 13 and 43 are equally inclined with respect to a radial plane. Indeed, the substantially rectilinear portion 43a terminates with an end portion that is slightly curve. The secondary transverse groove 43 has a depth ranging from about 4.0-8.0 mm (in the first part of the rectilinear portion 43a) to zero (at the end of tail 43b). The width of substantially rectilinear portion 43a of the secondary transverse groove 43 is about 2.5-8.0 mm.

The main transverse grooves 42 of external shoulder 8 comprises (from left to right in FIGS. 2 and 5): a tail 42a, a first substantially rectilinear portion 42b, a curve portion 42c and a second substantially rectilinear portion 42d. Tail 42a is similar to tail 12b but it is preferably directed in the opposite direction. Preferably, tail 42a is more inclined than the first rectilinear portion 42b. The first substantially rectilinear portion 42b is preferably inclined by the same angle α mentioned above. According to a preferred embodiment, the first substantially rectilinear portion 42b is inclined as the portion 12a. The first substantially rectilinear portion 42b has a width between about 4.0 mm and 8.0 mm and it has a maximum depth (in proximity of circumferential cut 15) of about 4.0 mm to 8.5 mm. The curve portion 42c connects the first and second substantially rectilinear portions 42b and 42d. Preferably, curve portion 42c has the same width and depth of rectilinear portion 42b. The radius of curvature of the curve portion 42c is between 15.0 and 30.0 mm. Preferably, the curve portion 42c crosses the circumferential out 15. The second rectilinear portion 42d is inclined by an angle δ with respect to a radial plane of the tyre. Angle δ is preferably of about 105°-130°, more preferably between 110° and 120' and still more preferably of about 115'. Preferably, the angle comprised between the first and second substantially rectilinear portions is higher than 90°. The second rectilinear portion 42d, preferably, has the same width and depth of the first rectilinear portion 42b (width=4.0-8.0 mm; depth=4.5-8.5 mm). Preferably, the first rectilinear portion 42b and the second rectilinear portion 42d converge in correspondence of the circumferential cut 15.

In a preferred embodiment of the present invention (FIGS. 2 and 4), the top end of the second substantially rectilinear portion 42d is connected to the circumferential groove 4 through a slightly curve portion 42e which has a reduced depth with respect to the rectilinear portion 42d. The depth of curve portion 42e is about 1.0-4.0 mm, preferably about 2.0 mm. Preferably, the curve portion 42e has a width of from 4.0 mm to 8.0 mm. As it is shown in FIG. 2 and FIG. 4, depressions 4b are provided in the raising portion 4a for "connecting" the curve portion 42e to the substantially rectilinear portion 32a in the central region.

Alternatively, according to a further embodiment of the present invention (shown in FIGS. 6, 7 and 8), the main transverse groove 42 is not provided with a curve portion 42e and the second substantially rectilinear portion 42d smoothly terminates at about 4.0-10.0 mm from groove 4. Preferably, the second substantially rectilinear portion 42d terminates at a distance (L5) from about 5% to about 40% of L2, more preferably from about 15% to about 30% of L2. Preferably, the second substantially rectilinear portion 42d terminates at a distance from about 30% to about 40% of the width of groove 4.

Preferably, the distance between two circumferentially consecutive (adjacent) main grooves 42 is substantially constant. Preferably, the distance between two circumferentially consecutive (adjacent) main grooves 42 is from about 25% and 35% of the tyre diameter. Said aspect positively contributes to the noiseness and longitudinal stiffness performances of the tyre of the invention.

The circumferential cut 15 is provided in the tyre according to the present invention in order to contribute to the hinge effect in the shoulder region. Profitably, circumferential cut 15 has a width of about 1.0-3.0 mm. The depth of the circumferential cut 15 varies from a reduced depth of about 1.0 to 4.0 mm to a full depth of about 4.0-7.5 mm. The parts (15a) of circumferential out 15 that have a reduced depth are those in correspondence of main transverse grooves 42; the parts (15b) of circumferential grooves that have a full depth are those in proximity of secondary transverse grooves 43. Preferably, secondary transverse grooves 43 do not cross the cut portions 15b.

The number of blocks in the external shoulder (when each block is defined between two main transverse grooves 42) ranges from 28 to 40. Thus, according to a preferred embodiment of the present invention, the pitch of the tread pattern is the same in the two shoulder regions as well as in the central region. The most axially external part of external shoulder region 8 (i.e. the part which is external to the circumferential cut 15—the part on the left in FIG. 2) has a pattern similar to that of the internal shoulder region 9 with secondary transverse grooves 43, 13 that are arranged between, and are preferably substantially parallel to, main transverse grooves 42, 12 respectively.

This arrangement of transverse grooves (12, 13 in the internal shoulder region 9 and 42, 43 in the external shoulder region—all of them belonging to the same transverse groove module 10) is advantageous in reducing the noise of the tyre tread pattern of the present invention since the grooves belonging to one shoulder are circumferentially staggered with respect to the grooves belonging to the opposite shoulder so that they enter the tyre footprint area at different time instants, thereby splitting the tread noise on a wide range of frequencies and favorably improving the noiseness performance of the tyre.

The other (axially inner) part of the external shoulder region 8 (the one between circumferential cut 15 and circumferential groove 4) is provided with the highly inclined main transverse grooves 42. If the main transverse grooves of the tread pattern 2 are considered, it can be noted that, in combination with the transverse grooves 22 of the remaining central portion 7 and with the transverse grooves 12 of the internal shoulder portion 9, they form a substantially continuous wave pattern which starts at one tyre shoulder and reaches the opposite one.

In considering a plan view (as shown in FIG. 2), the blocks which are defined among the circumferential cut 15, the adjacent circumferential groove 4 and two circumferentially consecutive main transverse grooves 42 are substantially rhomboid shaped, whilst the blocks defined among the circumferential cut 15, the external tyre shoulder and two circumferentially consecutive main transverse grooves 42 are substantially rectangular in shape.

The width of the tyre pattern according to the present invention is indicated with L (L is generally ≥ about 200 mm). The external shoulder 8 has a width L1 which ranges from about 25% to 35% of L. In particular, the region between circumferential cut 15 and circumferential groove 4 has a width L2 that ranges from 20% to 35% of L1. The internal shoulder 9 has a width L3 which is less than L1 and is preferably between about 20% and 30% of L. Finally, the central region 7 has a width L4 between about 25 and 40% of L.

The external shoulder of the tyre according to the present invention is substantially stiff, but the circumferential out 15 provides a positive and controlled flexibility of the tyre shoulder in a plane parallel to the equatorial plane and passing through said circumferential cut. Circumferential out 15 is not to be considered as a circumferential groove and does not contribute to aquaplaning performances. The aquaplaning performances are highly increased by the presence of the main transverse grooves 42 in combination with the circumferential grooves 4, 5, 6. As mentioned above, circumferential cut 15 provides a "hinge effect" which results in a larger contact area so that a larger rubber area is in contact with the rolling surface and thus both grip and handling performances are advantageously increased.

Figure 9:
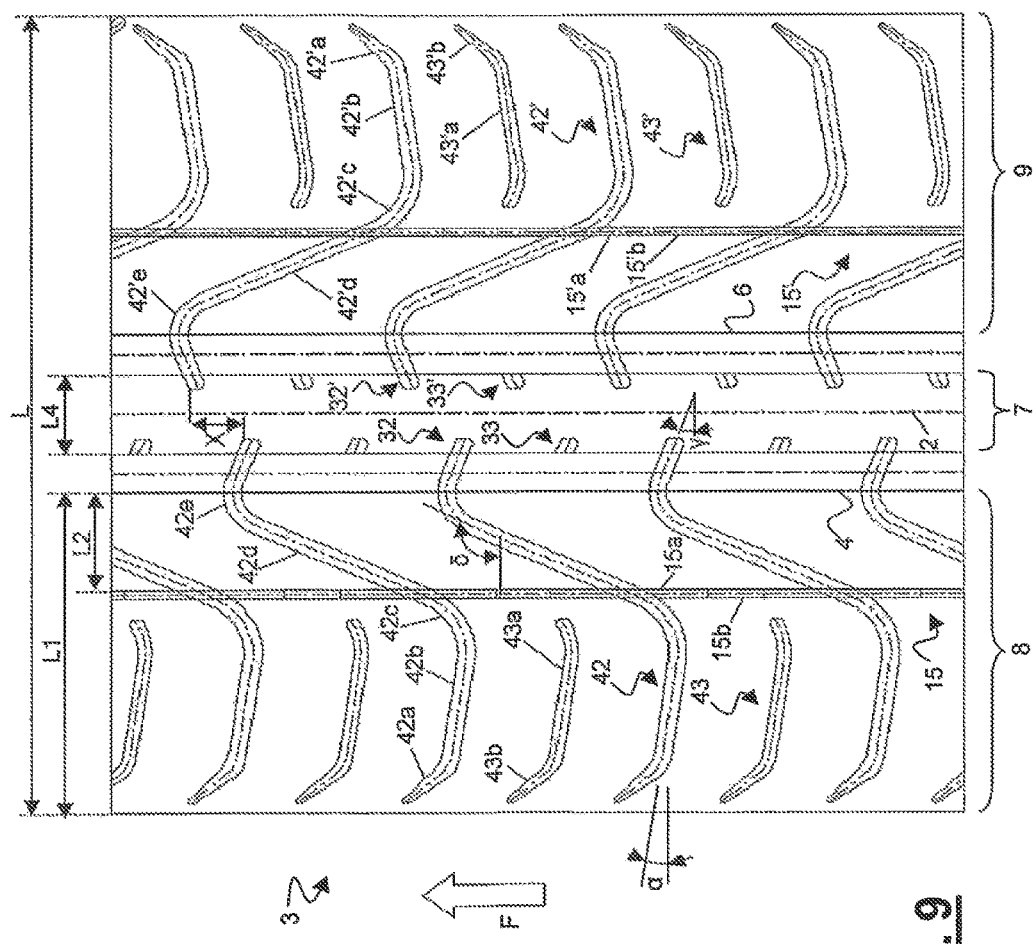
FIG. 9 is a partial plan view of a tyre tread according to a third embodiment.

FIG. 9 is a partial plan view of a tread of a tyre in accordance with a third embodiment of the present invention. Reference numbers similar to those of FIGS. 2 to 8 have been used in FIG. 9 for indicating functional equivalent components. It will be immediately recognized that the tread pattern of FIG. 9 is substantially symmetrical and it can be classified as a "directional" pattern whose rolling direction is indicated by arrow F.

In details, the tread of FIG. 9 comprises two circumferential grooves 4 and 6. Circumferential grooves 4 and 6 divide a tread central region 7 from two shoulder regions 8 and 9. A detailed description of shoulder region 8 will not be repeated because it substantially corresponds to external shoulder region 8 of FIGS. 2 to 6.

Figure 9A:
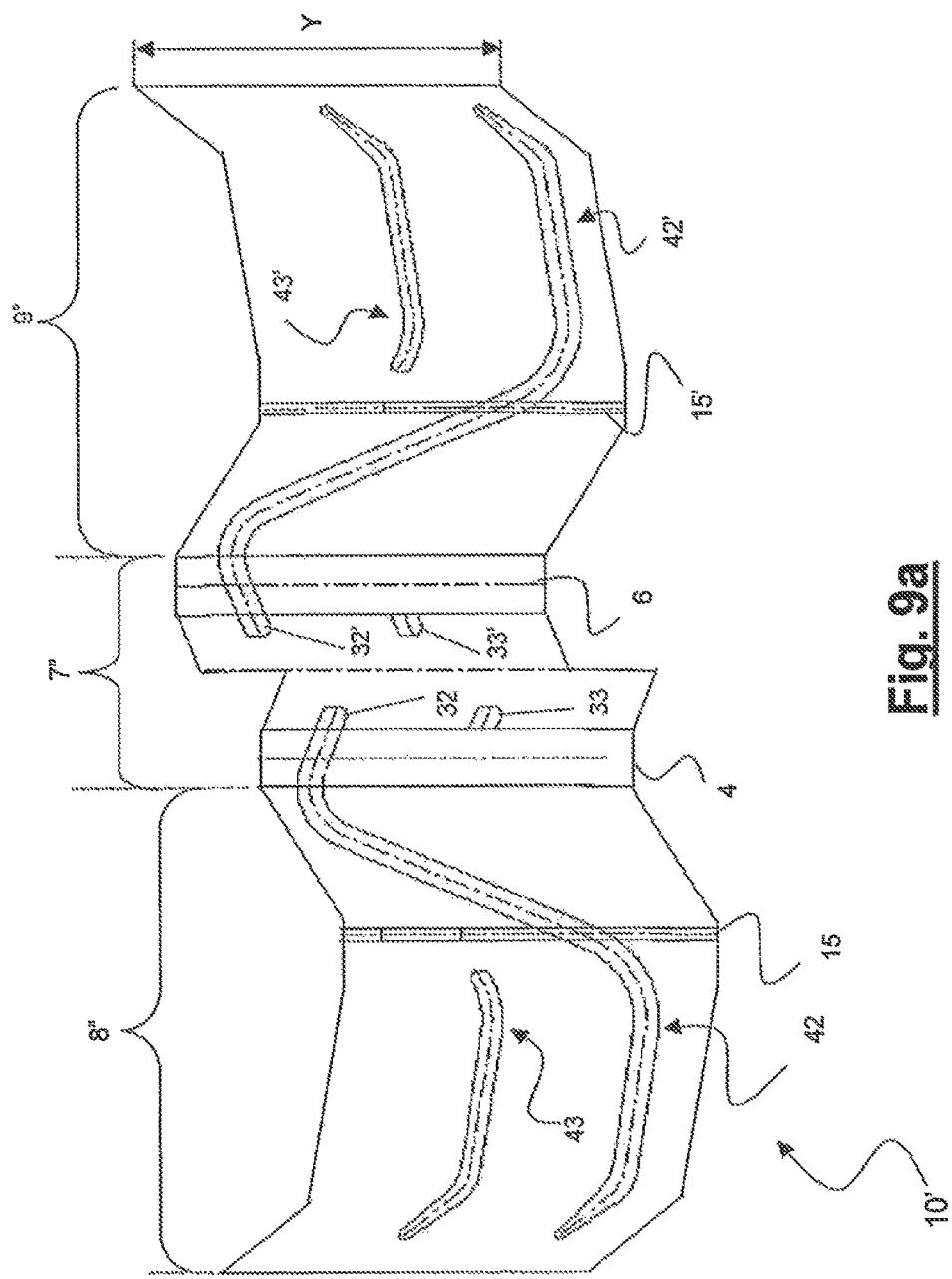
FIG. 9a is an enlarged view of a transverse groove module forming the tyre tread shown in FIG. 9.

As clearly indicated in FIG. 9a, the transverse groove module 10' of the embodiment shown in FIG. 9 comprises a first shoulder portion 8''', which substantially corresponds to the first shoulder portion 8' of module 10, and a second shoulder portion 9''' which comprises a main transverse groove 42' and a secondary transverse groove 43'.

Preferably, main transverse groove 42' and secondary transverse groove 43' of second shoulder portion 9''' are mirror-like elements—with respect to the tyre equatorial plane 2—of main transverse groove 42 and secondary transverse groove 43 of the first shoulder portion 8''' (i.e. main transverse groove 42' and secondary transverse groove 43' of second shoulder portion 9''' are mirror images of main transverse groove 42 and secondary transverse groove 43 of the first shoulder portion 8''' with respect to the tyre equatorial plane 2).

More preferably, the main transverse groove 42' of second shoulder portion 9''' of module 10' is circumferentially staggered of a distance X with respect to the main transverse groove 42 of the first shoulder portion 8'''.

Preferably, said distance X is comprised from about 5% to about 26% of a pitch length Y circumferentially measured. Pitch length Y is indicated in FIG. 9a.

Preferably, circumferential grooves 4 and 6 substantially correspond to grooves 4 and 6 of FIGS. 2 to 6 and will not be described in details.

The central region 7 comprises main transverse grooves 32, 32' and secondary transverse grooves 33, 33'. The main transverse grooves 32, 32' extend from circumferential grooves 4, 6 respectively and are preferably inclined by the same angle γ which has been defined above. The width and depth of main transverse grooves 32, 32' in the embodiment of FIG. 9 are the same as those of main transverse grooves 32 according to the embodiments shown in FIGS. 2-8. It will be recognized that main transverse grooves 32, 32' are substantially short projections of main transverse grooves 42, 42' respectively. The secondary transverse grooves 33, 33' are preferably inclined by the same angle γ as the main transverse grooves 32, 32'. Preferably, the secondary transverse grooves 33, 33' have the same width and depth of the main transverse grooves 32, 32' respectively. The secondary transverse grooves 33, 33' communicate with the circumferential grooves 4, 6 respectively and are arranged between main transverse grooves 32, 32' respectively.

Figure 6:
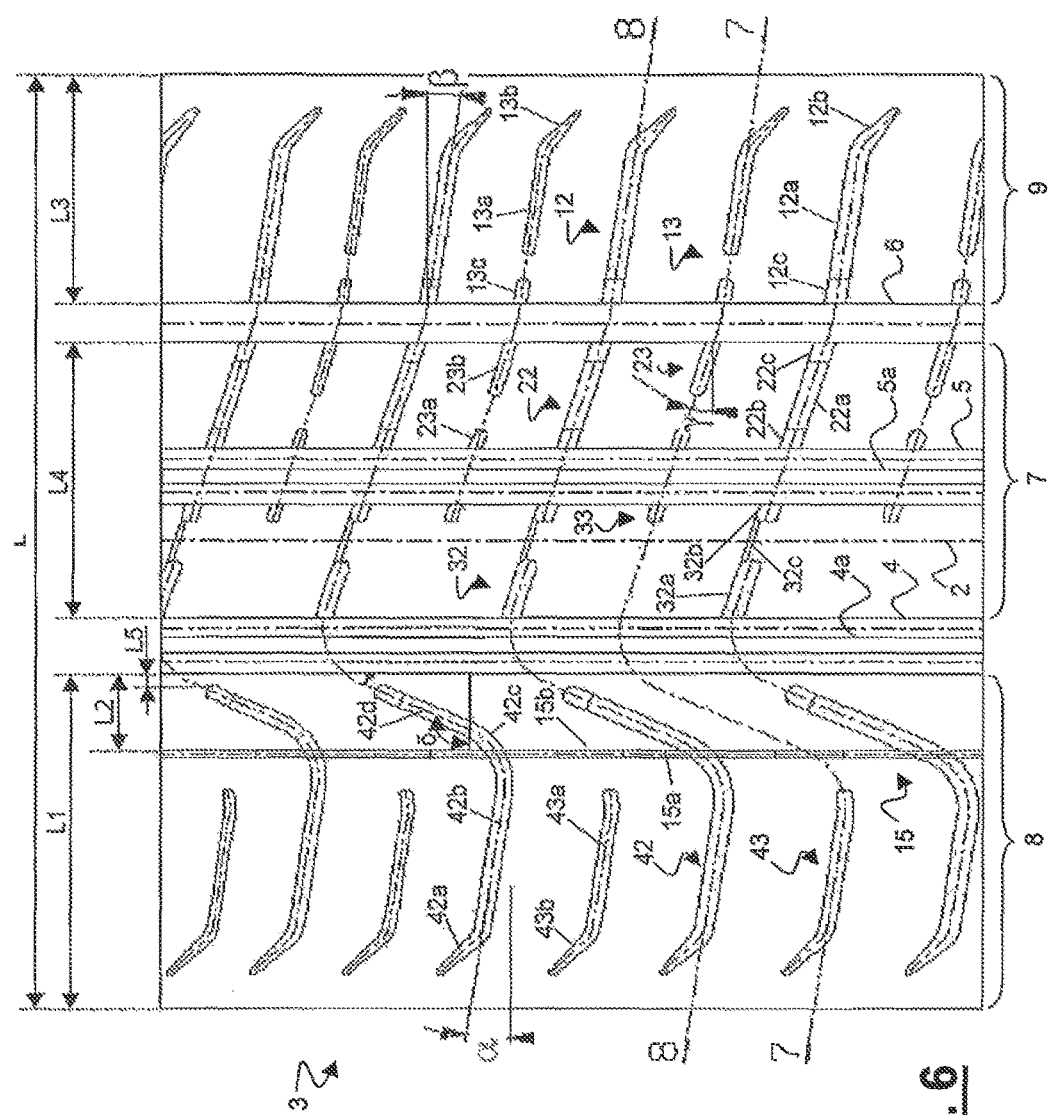
FIG. 6 is a partial plan view of a tyre tread according to a second embodiment of the present invention.

It can be pointed out that the tread pattern of FIG. 2 or FIG. 6, which possesses only three longitudinal (circumferential) grooves, provides the tyre with a lateral stiffness which is higher than that of a similar tyre having four longitudinal grooves, while the aquaplaning performance is even higher than that of a similar tyre having four longitudinal grooves, while ensuring very good grip, braking, noiseness and wear performances.

Tyres having a tread pattern according to the first embodiment (FIGS. 1-5) were subjected to comparative tests with tyres manufactured by the same Applicant and commercially known as "Pzero Rosso®". Said comparative tyres have been chosen because they are high performance tyres with excellent characteristics and have been approved for fast and very-high performance sport cars. The rear wheel tyres according to the present invention has a size of 265/35 R18; the front wheel tyres according to the present invention had a size of 225/40 R18. The inflation pressure was 2.5 bar for the front wheels and 3.0 bar for the rear wheels. The comparative tyres had the same structure, sizes and inflation pressures of the invention tyres.

A car, model "Porsche 996", was first equipped with four tyres according to the invention and then with four comparative tyres.

Aquaplaning tests were carried out along straight road sections and around bends, together with braking tests on dry and wet road surfaces, tests for noise inside and outside the car, and comfort tests.

The aquaplaning test along straight road sections was carried out along a straight section of smooth asphalt, of predefined length (100 m), with a layer of water of predefined constant height (7 mm) which was automatically restored after each test vehicle had passed by. The vehicle entered at a constant speed (approximately 100 km/h) in conditions of perfect grip and accelerated until the conditions of total loss of grip occurred.

The aquaplaning test around bends was carried out along a road section with smooth and dry asphalt, around a bend with a constant radius (100 m), having a predefined length and comprising, along a final section, a zone of predefined length (20 m) flooded with a layer of water of predefined thickness (6 mm). The test was carried out at a constant speed for different speed values.

The braking test was carried out both on a dry surface and on a wet surface where a rain fall of 60 mm of water per hour was simulated. The dry braking test consisted in decreasing the speed of the test car from 100 Km/h to 5 Km/h; the wet braking test consisted in decreasing the speed of the test car from 80 Km/h to 5 Km/h. The test was carried out alone a straight road section and braking distances were measured.

The results of the aquaplaning and braking tests are shown in Table I where the values assigned are expressed as a percentage against the values of the comparative tyre fixed at 100. Thus, values higher than 100 indicate an improvement with respect to the comparative tyres.

TABLE I

|  | Car with comparative tyres | Car with tyres according to the invention |
|---|---|---|
| Aquaplaning along straight sections ("straight aquaplaning") | 100 | 102.4 |
| Aquaplaning around bends ("lateral aquaplaning") | 100 | 113.0 |
| Dry braking test | 100 | 104.0 |
| Wet braking test | 100 | 101.0 |

As it can be inferred from Table 1, the car equipped with tyres according to the present invention gave very good performances in all conditions. In particular, excellent performances were obtained in lateral aquaplaning.

The comfort was evaluated in terms of the overall sensations perceived by a test driver compared to the capacity for the tyre to absorb the roughness of the road surface.

The results of the comfort test are shown in Table II where the values assigned are expressed as a percentage against the values of the comparative tyre fixed at 100. As it can be seen, the test driver perceived the same sensations by driving the car with the comparative tyres and the tyres according to the invention.

TABLE II

|  | Car with comparative tyres | Car with tyres according to the invention |
|---|---|---|
| Comfort | 100 | 100 |

The noise tests were carried out both indoors and outdoors.

The indoor tests were carried cut in an externally soundproofed chamber (semianechoic chamber) by using the abovementioned car equipped first with a tyre according to the invention and then with a comparative tyre, keeping the tyre in contact with a rotating drum made to rotate at different speeds. Microphones were arranged inside and outside the car in order to measure, respectively, the internal noise and external noise.

The outdoor test was carried out along a straight section equipped with microphones. The car entered the section at a predefined speed of entry, after which the engine was switched off and the noise outside the car in neutral gear was measured.

FIGS. 10a, 10b, 11a and 11b show the graphs relating to the noise level in dB(A) outside (FIG. 10a, 10b) and inside (FIG. 11a, 11b) the test car in relation to the speed (km/h) ranging from 20 to 150 km/h. The curves A1 and A2 relate to the comparative tyre PZero Rosso® 265/35ZR18; the curves A3 and A4 relate to the comparative tyre PZero Rosso® 225/40ZR18; the curves B1 and B2 relate to the tyre with a tread according to the first embodiment of the present invention while the curves B3 and B4 relate to the tyre with a tread according to the second embodiment of the present invention. PZero Rosso® 265/35ZR18 and the tyre with the first embodiment of tread pattern were mounted on the rear left of said car; PZero Rosso® 225/40ZR18 and the tyre with the second embodiment of tread pattern were mounted at the front left of said car.

Figure 10B:
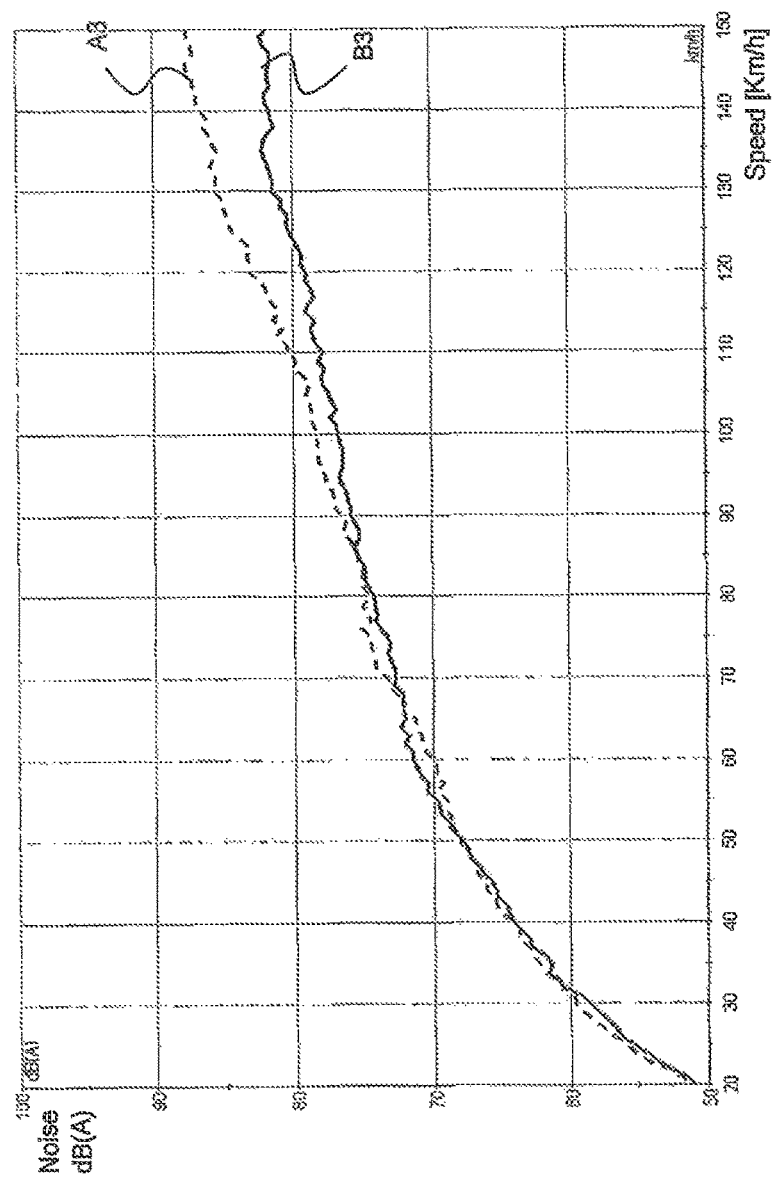
Figure 11A:
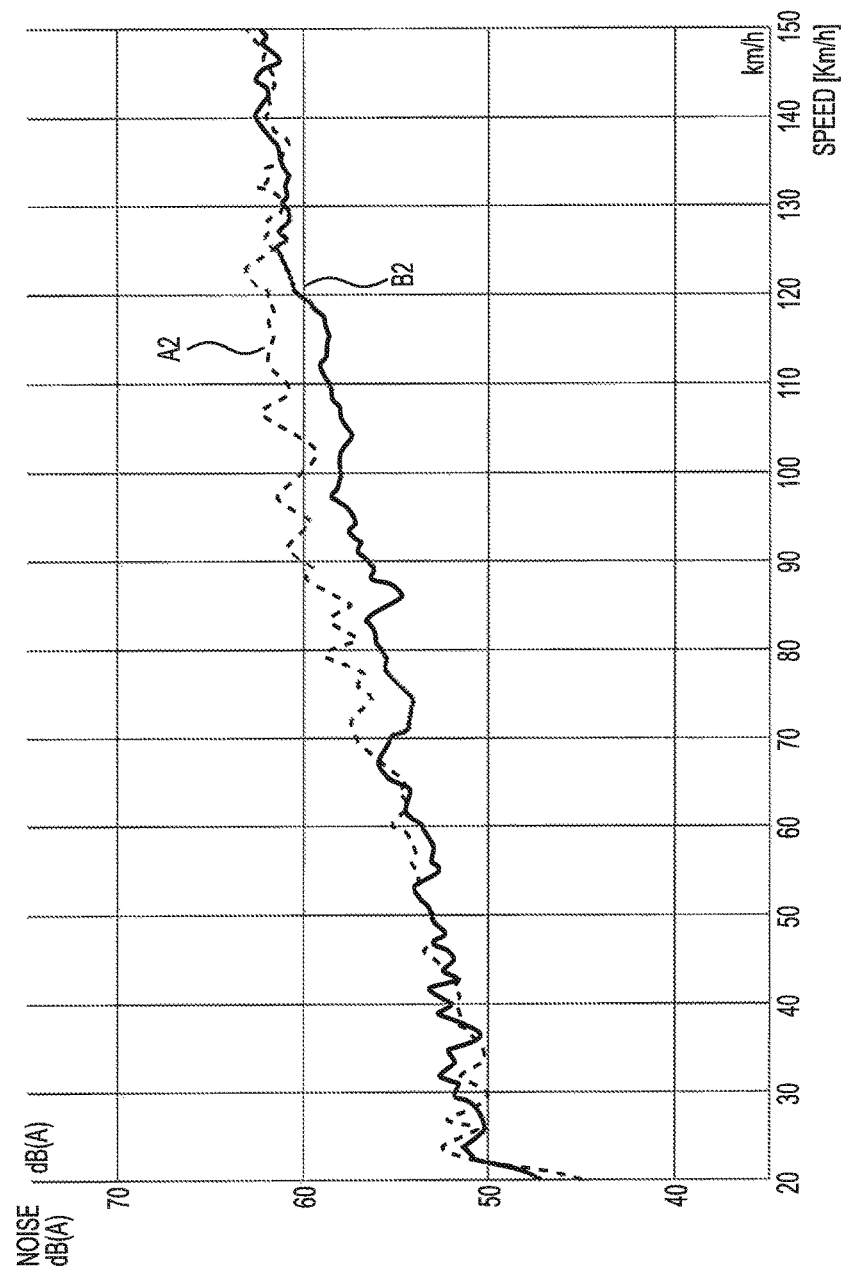

With reference to FIG. 10a, it may be noted that the tyre according to the invention had an external noise level which was lower than that of the comparative tyre at speeds lower than about 95 Km/h and which was substantially equivalent to it at speeds higher than 95 Km/h. With reference to FIG. 10b, it may be noted that the tyre according to the invention had an external noise level which was lower than that of the comparative tyre at speeds higher than about 85 Km/h and which was substantially equivalent to it at speeds lower than 85 Km/h. With reference to FIG. 11a, it may be noted that the tyre according to the invention had an internal noise level which was generally lower than or equal to that of the comparative tyre. Finally, with reference to FIG. 11b, it may be noted that the tyre according to the invention had an internal noise level which was lower than that of the comparative tyre at speeds higher than about 85 Km/h and which was higher to it at speeds higher than 85 Km/h.

Figure 12:
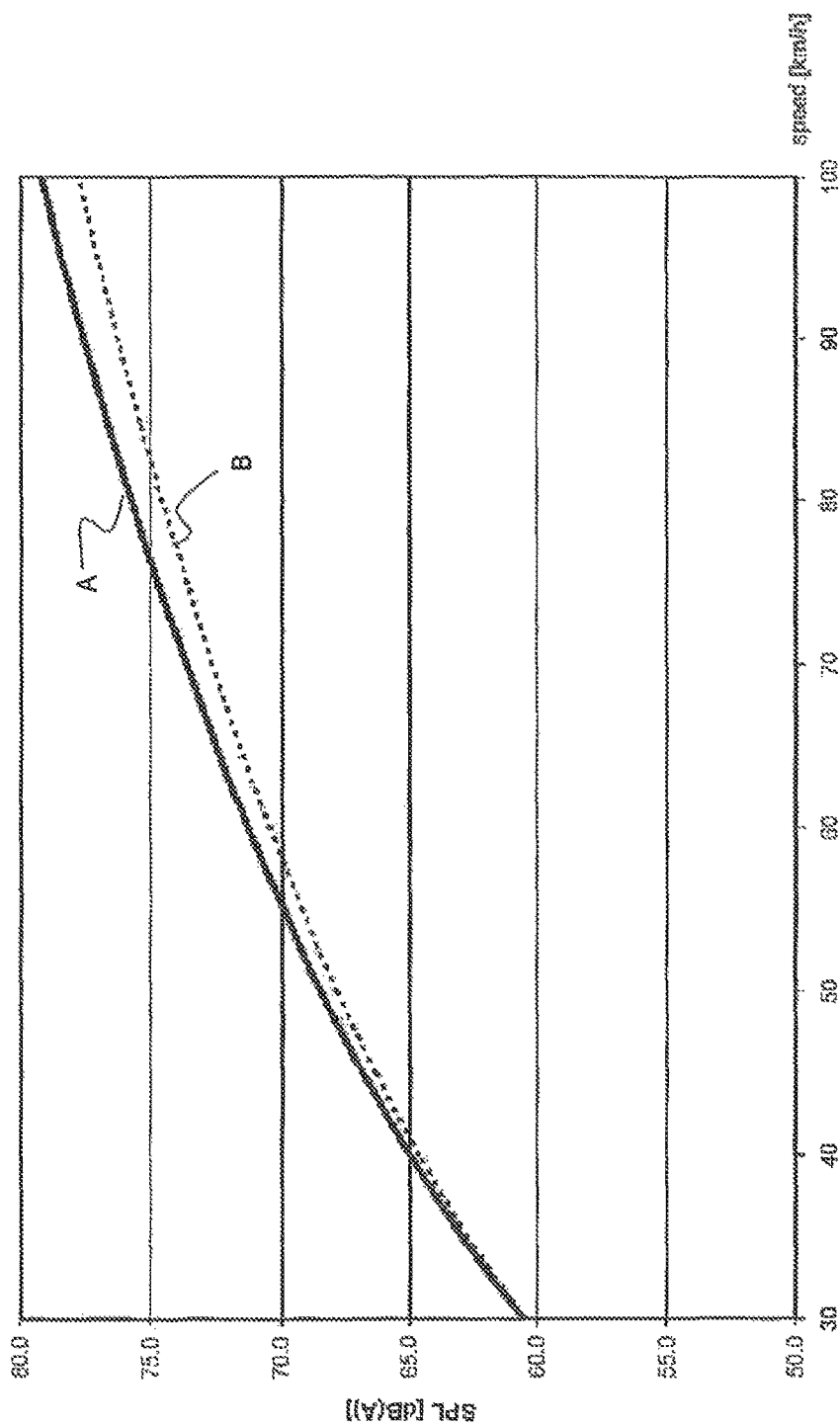
FIG. 12 shows a normalized sound pressure level graph as a function of a vehicle speed.
Figure 13:
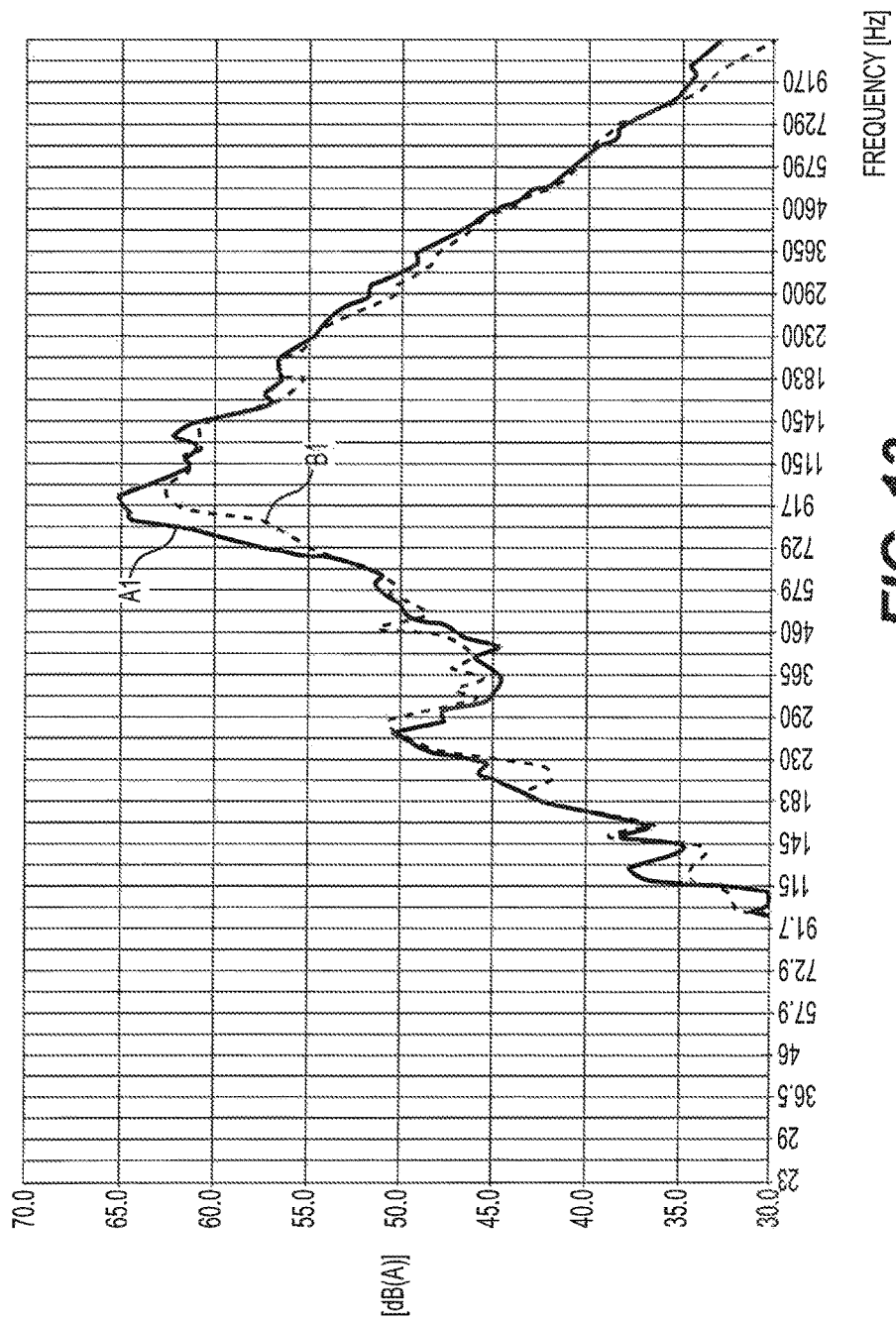
FIG. 13 shows a noise spectrum at about 80 Km/h.

FIG. 12 shows a normalized sound pressure level (SPL) graph as a function of a vehicle speed and FIG. 13 shows a noise spectrum at 80 Km/h. Curves A, A1 relate to the comparative tyre, whilst curves B, B1 relate to the tyre according to the present invention. In both cases, the tyre had a size 265/35ZR18 mounted on a 8J×18 rim.

The graphs show the result of the so-called "coast-by-noise" tests (ISO 362-1981, Amendment 1, published 1985) carried out with the car described above in accordance with the standard ISO 10844. During these tests the reference speed was 80 km/h.

FIG. 12 shows that the tyre according to the invention had proved to be less noisy than the comparative tyre. In particular, as it can be derived from FIG. 13, a reduction of noise was experienced at frequencies higher than about 500 Hz. Also in frequencies ranges 115-145 Hz and 183-230 Hz a big reduction of noise was detected.

Furthermore, lateral and longitudinal stiffness of a tyre according to the first embodiment of the present invention was calculated by computer simulation. The tread was finite element modeled as a rubber plate having a thickness equal to that of the tread band. As the tyre carcass structure is known, the contact area is experimentally established for a number of loads. In the finite element modeled plate, an area having a shape correspondent to the contact area is considered. AU the nodes that are in contact with the ground are constrained so that they become fixed. A11 the other nodes (those that are not in contact with the ground) are moved in a first direction X (resulting in a shift $S_X$ in such a first direction) and in a second direction Y (resulting in a shift $S_Y$ in such a second direction). Thus, it becomes possible to calculate the forces which are requested for moving the nodes into the first and second directions ($F_X$ and $F_Y$, respectively). Finally, the stiffness in the first direction X (longitudinal stiffness) is given by $K_X=F_X/S_X$ and the stiffness in the second direction Y (lateral stiffness) is given by $K_Y=F_Y/S_Y$.

The results of the stiffness computer simulation are shown in Table III where the values assigned are expressed as a percentage against the values of the comparative tyre fixed at 100. Thus, values higher than 100 indicate an improvement with respect to the comparative tyre.

TABLE III

|  | Comparative tyre | Tyre according to the invention |
|---|---|---|
| Longitudinal stiffness ($K_X$) | 100 | 112.6 |
| Lateral stiffness ($K_Y$) | 100 | 112.3 |

Thus, the tyre according to the present invention has shown a high stiffness.

Finally, a handling test in dry surface conditions was carried out along predefined sections. For the handling test a car Ferrari, model 575, was used. For this test, the rear wheel tyres according to the present invention had a size of 305/35 R19; the front wheel tyres according to the present invention had a size of 255/40 R19. The inflation pressure was 2.5 bar for the front wheels and 3.0 bar for the rear wheels. The comparative tyres Pzero Rosso® had the same structure, sizes and inflation pressures of the invention tyres.

In order to evaluate the tyre behavior, the test driver simulated some characteristic maneuvering (change of lane, entering a bend, leaving a bend, for example) carried out at constant speed, in acceleration and in deceleration. Then the test driver judged the tyre behavior and assigned a score depending on the tyre performance during said maneuvering.

The handling is generally divided into two voices (soft handling and hard handling) depending on the type of manoeuvre carried out by the test driver. The soft handling relates to the use of the tyre under normal driving conditions, i.e. in conditions of normal speed and good transversal grip. On the contrary, the hard handling tests describe the behaviour of the tyre at the limit of adherence, i.e. under extreme driving conditions. In the latter case the test driver executes manoeuvres which an average driver might be forced to carry out in the case of unforeseen and hazardous circumstances: sharp steering at high speed, sudden changing of lanes to avoid obstacles, sudden braking, and the like.

Two different types of tests were carried out: behaviour at normal speed (soft handling) and behaviour at the limit of adherence (hard handling).

As far as the soft handling tests were concerned, the test driver assessed: emptiness in the centre, that is the delay and the degree of response of the vehicle to small steering angles; the promptness of response to the steering coming into a bend; the progressiveness of response to the steering travelling in a bend; centring in a bend, that is the tyre capacity to keep the vehicle on a bend with a constant radius without continuous steering corrections; realignment, that is the capacity of the tyre to allow the vehicle to return to a rectilinear trajectory at the exit of a bend with contained and dampened transverse oscillations.

As far as the hard handling tests were concerned, the test driver assessed: the force on the steering wheel when turning violently; the promptness of insertion, that is the behaviour of the tyre in transition at the entrance of the bend taken at the limit speed; the balancing, that is the degree of over-steering or under-steering of the vehicle; the yield, that is the tyre capacity to absorb a strong fast transfer of the load as a consequence of a sudden change of lane without excessive deformation, and therefore without compromising vehicle stability and controllability; release in a bend, that is the tyre capacity to dampen the effects of instability resulting from the sudden release of the accelerator during a bend taken at the limit speed; controllability, that is the tyre capacity to maintain and/or return the vehicle to the trajectory after the loss of adherence.

Table IV sums up the test driver's score sheet for the tyres controllability. The results of said tests are expressed by means of an evaluation scale representing the subjective opinion expressed by the test driver through a point system. The values reproduced in the following table represent a mean value between those obtained in several test sessions (5-6 tests, for example) and given by several test drivers.

TABLE IV

| Handling | Test carried out by the test drivers | Car with tyres according to the invention | Car with comparative tyres |
|---|---|---|---|
| Steering behavior (Soft handling) | Emptiness at the center | 7 | 6.5 |
|  | Promptness | 7 | 6 |
|  | Progressiveness | 7 | 6 |
|  | Centring in bend | 7.5 | 6 |
|  | Realignment | 7 | 6 |
| Behavior at limit (Hard handling) | Promptness of insertion | 7 | 6 |
|  | Balancing | 7 | 6 |
|  | Release in bend | 7 | 6 |
|  | Understeering | 7 | 6.5 |
|  | Oversteering | 7.5 | 6.5 |
|  | Controllability | 7.5 | 6.5 |

The invention claimed is:

1. A tyre for a motor vehicle comprising a tread having an overall width and comprising first and second circumferential grooves which separate a central region from first and second shoulder regions, comprising:
   a circumferential cut in said first shoulder region at a distance from said first circumferential groove; and
   a plurality of circumferentially repeated transverse groove modules, wherein a first shoulder portion of each transverse groove module comprises at least one main transverse groove comprising:
   a first substantially rectilinear portion inclined by a first angle with respect to a radial plane;
   a second substantially rectilinear portion inclined by a second angle with respect to said radial plane and arranged between said circumferential cut and said first circumferential groove; and
   a first curve portion connecting said first and said second substantially rectilinear portions;
   wherein said central region comprises a main transverse groove for each transverse groove module, and wherein said main grooves of said central region are inclined by a fourth angle, wherein said fourth angle is inclined in a direction substantially the same as said first angle and substantially opposite said second angle.

2. The tyre according to claim 1, wherein said main transverse groove further comprises a second curve portion connecting said second substantially rectilinear portion to said first circumferential groove.

3. The tyre according to claim 2, wherein said second curve portion has a depth that is lower than a depth of said second substantially rectilinear portion.

4. The tyre according to claim 1, wherein said first shoulder region has a width that is 25% to 35% of said overall width.

5. The tyre according to claim 1, wherein said distance between said circumferential cut and said first circumferential groove is 25% to 35% of a width of said first shoulder region.

6. The tyre according to claim 1, wherein said second substantially rectilinear portion ends at a distance from said first circumferential groove that is about 5% to about 40% of the distance between said circumferential cut and said first circumferential groove.

7. The tyre according to claim 1, wherein said second substantially rectilinear portion ends at a distance from said first circumferential groove that is about 30% to 40% of a width of said first circumferential groove.

8. The tyre according to claim 1, wherein said first angle is 3° to 10°.

9. The tyre according to claim 1, wherein said first angle is 7° to 9°.

10. The tyre according to claim 1, wherein said second angle is 105° to 130°.

11. The tyre according to claim 1, wherein said second angle is 110° to 120°.

12. The tyre according to claim 1, wherein said main transverse groove further comprises a tail connected to said first substantially rectilinear portion.

13. The tyre according to claim 1, wherein said circumferential cut comprises cut portions having a first depth and cut portions having a second depth, said first depth being lower than said second depth.

14. The tyre according to claim 13, wherein said main transverse groove crosses said circumferential cut at a cut portion having said first depth.

15. The tyre according to claim 1, further comprising, a secondary transverse groove for each transverse groove module.

16. The tyre according to claim 15, wherein said secondary transverse groove comprises a tail and a substantially rectilinear portion parallel to said first substantially rectilinear portion of said main transverse groove of said first shoulder portion.

17. The tyre according to claim 15, wherein said secondary transverse groove has a width that is lower than a width of said main transverse groove.

18. The tyre according to claim 1, wherein said second shoulder region comprises a main transverse groove and a secondary transverse groove at least partially parallel to said main transverse groove for each transverse groove module.

19. The tyre according to claim 18, wherein said main transverse groove and said secondary transverse groove are inclined by a third angle with respect to said radial plane, said third angle ranging from 3° to 10°.

20. The tyre according to claim 19, wherein said third angle is the same as said first angle.

21. The tyre according to claim 1, wherein said central region comprises a main transverse groove and a secondary transverse groove for each transverse groove module.

22. The tyre according to claim 21, wherein said secondary transverse groove is parallel to said main transverse groove.

23. The tyre according to claim 21, wherein said main and secondary transverse grooves are inclined by a fourth angle with respect to a radial plane, said fourth angle ranging from 10° to 30°.

24. The tyre according to claim 1, wherein said second shoulder region comprises for each transverse groove module, a main transverse groove that is a mirror image of the main transverse groove of said first shoulder region with respect to the tyre equatorial plane.

25. The tyre according to claim 24, wherein the main transverse groove of the second shoulder region is circumferentially staggered a distance with respect to the main transverse groove of said first shoulder region.

26. The tyre according to claim 1, wherein the number of transverse groove modules is 28 to 40.

27. The tyre according to claim 1, wherein the transverse groove modules are circumferentially consecutive.

28. A tyre for a motor vehicle comprising a tread having an overall width and comprising first and second circumferential grooves which separate a central region from first and second shoulder regions, comprising:
    a circumferential cut in said first shoulder region at a distance from said first circumferential groove; and
    a plurality of circumferentially repeated transverse groove modules, wherein a first shoulder portion of each transverse groove module comprises at least one main transverse groove comprising:
    a first substantially rectilinear portion inclined by a first angle with respect to a radial plane;
    a second substantially rectilinear portion inclined by a second angle with respect to said radial plane and arranged between said circumferential cut and said first circumferential groove; and
    a first curve portion connecting said first and said second substantially rectilinear portions;
  wherein said main transverse groove further comprises a second curve portion connecting said second substantially rectilinear portion to said first circumferential groove, and
  wherein said second curve portion has a depth that is lower than a depth of said second substantially rectilinear portion.

\* \* \* \* \*